(12) United States Patent
Ishida

(10) Patent No.: US 7,329,632 B2
(45) Date of Patent: Feb. 12, 2008

(54) THERMAL TRANSFER INK, THERMAL TRANSFER SHEET, AND THERMAL TRANSFER RECORDING METHOD USING THE SAME

(75) Inventor: Mio Ishida, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/430,968

(22) Filed: May 10, 2006

(65) Prior Publication Data

US 2006/0204683 A1    Sep. 14, 2006

Related U.S. Application Data

(63) Continuation of application No. PCT/JP2004/009743, filed on Jul. 8, 2004.

(51) Int. Cl.
*B41M 5/035*    (2006.01)
*B41M 5/50*    (2006.01)

(52) U.S. Cl. .................... 503/227; 106/31.49

(58) Field of Classification Search ............ None
See application file for complete search history.

(56) References Cited

U.S. PATENT DOCUMENTS

| | | | |
|---|---|---|---|
| 4,866,029 A | 9/1989 | Evan et al. | |
| 5,041,411 A | 8/1991 | Chapman et al. | |
| 2003/0183122 A1 | 10/2003 | Mio et al. | |

FOREIGN PATENT DOCUMENTS

| | | |
|---|---|---|
| GB | 1 433 102 | 4/1976 |
| JP | 49-114420 | 10/1974 |
| JP | 2-3450 | 1/1990 |
| JP | 2-266348 | 10/1990 |
| JP | 3-210554 | 9/1991 |
| JP | 4-265792 | 9/1992 |
| JP | 4-275184 | 9/1992 |
| JP | 9-240154 | 9/1997 |
| JP | 10-864 | 1/1998 |
| JP | 10-157314 | 6/1998 |
| JP | 10-181224 | 7/1998 |
| JP | 10-203029 | 8/1998 |
| JP | 10-305665 | 11/1998 |
| JP | 11-147375 | 6/1999 |
| JP | 2000-103174 | 4/2000 |
| JP | 2000-185475 | 7/2000 |
| JP | 2003-221535 | 8/2003 |
| JP | 2004-230878 | 8/2004 |

*Primary Examiner*—Bruce H. Hess
(74) *Attorney, Agent, or Firm*—Oblon, Spivak, McClelland, Maier & Neustadt, P.C.

(57) ABSTRACT

Provided are a thermal transfer yellow ink and a thermal transfer sheet capable of providing a thermal transfer recorded product exhibiting a clear yellow tone with a high density by low energy and having an excellent color tone and light resistance, and also capable of exhibiting a favorable green color tone with a high density when mixed with cyan.

Provided are a dye composition characterized by comprising a dye having an arylidene pyrazolone skeleton and a dye having a bispyrazolone methine skeleton; a thermal transfer ink characterized by comprising a dye having an arylidene pyrazolone skeleton, a dye having a bispyrazolone methine skeleton, and a medium; and a thermal transfer sheet comprising a substrate and a colorant layer formed thereon, wherein the colorant layer comprises a dye having an arylidene pyrazolone skeleton and a dye having a bispyrazolone methine skeleton.

7 Claims, No Drawings

THERMAL TRANSFER INK, THERMAL TRANSFER SHEET, AND THERMAL TRANSFER RECORDING METHOD USING THE SAME

TECHNICAL FIELD

The present invention relates to a thermal transfer ink used for thermal transfer recording, particularly, for thermal transfer recording of a dye transfer type, a thermal transfer recording sheet, and a thermal transfer recording method using the same.

BACKGROUND ART

The thermal transfer recording of the dye transfer type is a recording method in which a thermal transfer sheet having a colorant layer containing a thermally transferable dye formed on a base film is overlaid on an image-receiving sheet having a dye-receiving layer on its surface and in which the thermal transfer sheet is heated to transfer the dye in the thermal transfer sheet onto the image-receiving sheet, thereby effecting recording. Since this recording method enables a gradation expression by controlling a transfer amount of the dye by a level of thermal energy, it is applied to full color image recording in a video printer or the like.

In such thermal transfer recording of the dye transfer type, the dye to be used for the transfer sheet and the dye used in an ink composition for the transfer sheet considerably affect the speed of the transfer recording, the image quality and storage stability of a recorded product, and others, and properties of the dye are thus very important. The dye is required to meet the following conditions.

1) Easy sublimation and/or thermal diffusion under an operating condition of a thermal recording head.
2) No thermal decomposition under an operating condition of a thermal recording head.
3) Possession of a preferable hue for color reproduction.
4) A large molecular extinction coefficient.
5) Stability to heat, light, moisture, chemicals, and so on.
6) Easy synthesis.
7) Excellent suitability for formation of an ink.
8) No safety problem.

Heretofore, it is known to use an arylidene pyrazolone type dye represented by the general formula (I) as a dye for thermal transfer recording in a sublimation system among dyes to be used for such thermal transfer recording (cf. Patent Documents 1 to 3, for example). In addition, it is also known to use a combination of an arylidene pyrazolone type dye with a specific dicyanomethine type yellow dye, and a combination of an arylidene pyrazolone type dye with a specific pyridone azo type yellow dye (cf. Patent Documents 2 and 3).

Furthermore, it is known to use a bispyrazolone methine type dye represented by the general formula (II) as a dye for thermal transfer recording in the sublimation system, and it is described to use a combination of a bispyrazolone methine type dye with a specific pyrazolone azo type yellow dye, a combination of a bispyrazolone methine type dye with a specific pyridone azo type yellow dye, a combination of a bispyrazolone methine type dye with a specific quinophthalone type yellow dye, and a combination of three kinds of specific dyes including a bispyrazolone methine type dye (cf. Patent Documents 4 to 7, for example).

Patent Document 1: JP-A-2-3450
Patent Document 2: JP-A-4-265792
Patent Document 3: JP-A-4-275184
Patent Document 4: JP-A-10-864
Patent Document 5: JP-A-10-181224
Patent Document 6: JP-A-10-203029
Patent Document 7: JP-A-2000-103174

DISCLOSURE OF THE INVENTION

Problem to be Solved by the Invention

However, the dyes or the dye mixtures specifically disclosed in any of the above prior art references, still failed to achieve satisfactory performance as shown in Comparative Examples described below. Therefore, there were desires for development of a thermal transfer recording ink and sheet ensuring a high recording density, a clear color tone of a recorded product, high stability of a recorded product and comprehensively excellent properties as a yellow dye for thermal transfer recording.

It is an object of the present invention to provide a thermal transfer ink, a thermal transfer sheet and a thermal transfer recording method which achieve comprehensively excellent performance in all the aforementioned properties 1) to 8) required for the dye for thermal transfer recording, particularly, a high recording density, a clear color tone of a recorded product and high stability of a recorded product.

Means for Solving the Problem

The thermal transfer ink according to the present invention is characterized by comprising a dye having an arylidene pyrazolone skeleton, a dye having a bispyrazolone methine skeleton, and a medium.

The thermal transfer recording sheet according to the present invention is characterized by comprising a substrate and a colorant layer formed thereon, wherein the colorant layer comprises a dye having an arylidene pyrazolone skeleton, a dye having a bispyrazolone methine skeleton, and a binder.

The thermal transfer recording method according to the present invention is a method of carrying out thermal transfer recording with use of the thermal transfer sheet of the present invention, which is characterized in that a recorded image has a value a* of at least −13 and at most 10 and a value b* of at least 60 in a CIELAB space at a color density of 1.0, in setting at a view angle of 2° and with a D50 light source.

Namely, the present inventors have conducted extensive studies on yellow dye mixtures for thermal transfer recording in order to achieve the above object, and have found that when the dye having the arylidene pyrazolone methine skeleton of (A) below and the dye having the bispyrazolone methine skeleton of (B) below are used in combination, a recorded product obtained thereby has a high recording density, a clear color tone, high stability and comprehensively superior properties to the conventional products. The present invention has been accomplished on the basis of this discovery.

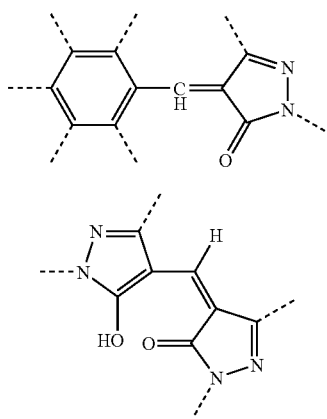

(A)

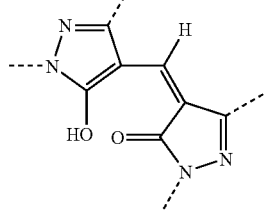

(B)

In the above formulae, each dotted line represents no substitution, or possession of an optional substituent.

Namely, the foregoing dye having the arylidene pyrazolone skeleton is highly sensitive in thermal transfer recording but is tinged with red for a yellow dye, and thus insufficient in view of the color tone. When the dye having the arylidene pyrazolone skeleton is combined with a dye having the bispyrazolone methine skeleton, a dye is obtained with comprehensively excellent properties such as a color tone, sensitivity, and light resistance. This is because the dye having the bispyrazolone methine skeleton shows a greenish yellow color tone to suppress the redness of the above-mentioned dye having the arylidene pyrazolone skeleton, while maintaining sufficient sensitivity and light resistance.

The thermal transfer ink and sheet of the present invention are suitably applicable as a thermal transfer yellow ink and thermal transfer yellow sheet and suitably provide those with a maximum absorption wavelength (λmax) of the dye being from 350 to 480 nm.

Effects of the Present Invention

The present invention provides a thermal transfer recording dye composition, thermal transfer recording ink, thermal transfer recording sheet ensuring comprehensively excellent performance in all the properties required for the thermal transfer recording dye, a high sensitivity, a high recording density, a clear color tone of a recorded product, and high stability of a recorded product, and thermal transfer recording method using the same.

In particular, the present invention enables the following effects: a thermal transfer recorded product exhibits clear yellow with a high density by low energy, has a color tone with a preferable hue as yellow, and shows remarkably good light resistance; a preferable green color tone with a high density can be obtained in a color mixture with cyan; and the resulting recorded product demonstrates considerably good light resistance.

BEST MODE FOR CARRYING OUT THE INVENTION

Now, the embodiments of the present invention will be described below in detail.

First, the dye having the arylidene pyrazolone skeleton, and the dye having the bispyrazolone methine skeleton used in the present invention will be explained.

It should be noted that a preferred carbon number of each exemplified group below, if provided with a substituent, is a total carbon number including a carbon number of the substituent.

The dye having the arylidene pyrazolone skeleton used in the present invention is preferably an arylidene pyrazolone dye represented by the general formula (I) below. In the general-formula (I) below, numbers 1 to 4 represent sites for a substituent in the ring A.

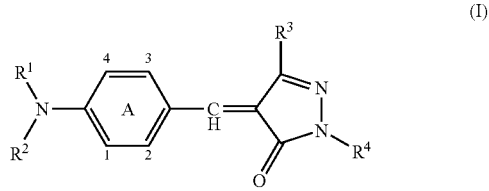

(I)

In the general formula (I), the ring A is a benzene ring which may have an optional substituent, preferably, a benzene ring which may be substituted by a substituent selected from the group consisting of a $C_{1-10}$ alkyl group which may be substituted, a $C_{1-10}$ alkoxy group which may be substituted, and a halogen atom. When the benzene ring has a substituent, the substitution site may be any of the 1-position to 4-position (the sites of 1 to 4), and is preferably the 3-position (the site of 3).

Each of $R^1$ and $R^2$ which are independent of each other, is a hydrogen atom, an alkyl group which may be substituted, an allyl group, an aryl group which may be substituted, or a cycloalkyl group which may be substituted, and among them it is preferably a $C_{1-12}$ alkyl group which may be substituted, an allyl group, a $C_{6-10}$ aryl group which may be substituted, or a $C_{5-7}$ cycloalkyl group which may be substituted.

$R^3$ is a hydrogen atom, an alkyl group which may be substituted, an $NR^9R^{10}$ group, an alkoxy group which may be substituted, an alkoxycarbonyl group which may be substituted, an aryl group which may be substituted, or a $C(O)NR^{9A}R^{10A}$ group, and among them it is preferably a hydrogen atom, a $C_{1-10}$ alkyl group which may be substituted, a $C_{1-8}$ $NR^9R^{10}$ group, a $C_{1-8}$ alkoxy group which may be substituted, a $C_{2-9}$ alkoxycarbonyl group which may be substituted, a $C_{6-10}$ aryl group which may be substituted, or a $C_{3-9}$ $C(O)NR^{9A}R^{10A}$ group.

$R^4$ is an alkyl group which may be substituted, or an aryl group which may be substituted, and among them it is preferably a $C_{1-12}$ alkyl group which may be substituted, or a $C_{6-10}$ aryl group which may be substituted.

Each of $R^9$, $R^{10}$, $R^{9A}$ and $R^{10A}$ which are independent of one another, is a hydrogen atom, an alkyl group which may be substituted, or an aryl group which may be substituted, and among them it is preferably a hydrogen atom, a $C_{1-10}$ alkyl group which may be substituted, or a $C_{6-10}$ aryl group which may be substituted.

In particular, each of $R^1$ and $R^2$ which are independent of each other, is preferably a $C_{1-8}$ linear or branched alkyl group, $R^3$ is preferably a $C_{1-4}$ linear or branched alkoxy group, a $C_{1-8}$ linear or branched dialkyl amino group, or a $C_{2-9}$ linear or branched alkoxycarbonyl group, and $R^4$ is preferably a phenyl group or a phenyl group having a halogen atom as a substituent. If the molecular weight is too large, solubility in a medium will become lower and reproducibility of a deep color will degrade. On the other hand, if the molecular weight is too small, reproducibility of a light color will degrade. In the above general formula (I), therefore, a total of formula weights of the substituents $R^1$, $R^2$, $R^3$ and $R^4$ is preferably at least 80, and more preferably at least 120. On the other hand, it is preferably at most 300 and more preferably at most 250.

The dye having the bispyrazolone methine skeleton to be used in the present invention is preferably a bispyrazolone methine dye represented by the general formula (II) below.

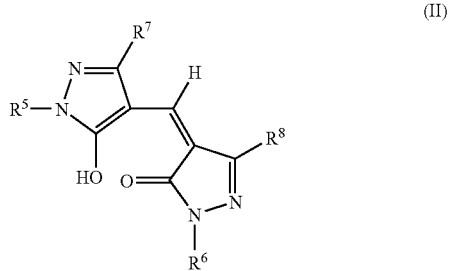

(II)

In the general formula (II), each of $R^5$ and $R^6$ which are independent of each other, is an alkyl group which may be substituted, an alkenyl group which may be substituted, or an aryl group which may be substituted, and among them it is preferably a $C_{1-10}$ alkyl group which may be substituted, a $C_{1-10}$ alkenyl group which may be substituted, or a $C_{6-10}$ aryl group which may be substituted.

Each of $R^7$ and $R^8$ which are independent of each other, is an alkyl group which may be substituted, an $NR^{9B}R^{10B}$ group, an alkoxy group which may be substituted, an alkoxycarbonyl group which may be substituted, an aryl group which may be substituted, or a $C(O)NR^{9C}R^{10C}$ group, and among them, it is preferably a $C_{1-10}$ alkyl group which may be substituted, a $C_{1-8}$ $NR^{9B}R^{10B}$ group, a $C_{1-8}$ alkoxy group which may be substituted, a $C_{2-9}$ alkoxycarbonyl group which may be substituted, a $C_{6-10}$ aryl group which may be substituted, or a $C_{3-9}$ $C(O)NR^{9C}R^{10C}$ group.

Each of $R^{9B}$, $R^{10B}$, $R^{9C}$ and $R^{10C}$ which are independent of one another, is a hydrogen atom, an alkyl group which may be substituted or an aryl group which may be substituted, and among them, it is preferably a hydrogen atom, a $C_{1-10}$ alkyl group which may be substituted or a $C_{6-10}$ aryl group which may be substituted.

In particular, each of $R^5$ and $R^6$ which are independent of each other is preferably a $C_{1-8}$ linear or branched alkyl group, a $C_{6-10}$ phenyl group or a phenyl group having a halogen atom as a substituent, and each of $R^7$ and $R^8$ which are independent of each other is preferably $C_{1-8}$ linear or branched alkyl group.

Among them, the bispyrazolone methine dye represented by the general formula (II) is most preferably a dye in which each of $R^5$ and $R^6$ is a phenyl group and in which each of $R^7$ and $R^8$ is a methyl group, and this dye is a compound known as so-called C. I. Solvent Yellow 93.

Each of the alkyl groups as $R^1$—$R^{10}$, $R^{9A}$, $R^{10A}$, $R^{9B}$, $R^{10B}$, $R^{9C}$, $R^{10C}$, and the substituent of the ring A in the above general formulae (I) and (II) may be a $C_{1-12}$, preferably $C_{1-10}$, linear or branched alkyl group, and specific examples thereof include a methyl group, an ethyl group, an n-propyl group, an i-propyl group, an n-butyl group, an i-butyl group, a t-butyl group, an n-hexyl group, an n-octyl group, a 2-ethylhexyl group, and so on.

In a case where the alkyl group is substituted, the substituent may be a halogen atom, an alkoxy group, an aryl group, a cyano group, an aryloxy group, an alkoxycarbonyl group, an aryloxycarbonyl group, an acyloxy group, or the like. Specific preferred examples of the substituent include the following groups.

An alkoxy group-substituted alkyl group such as a 2-ethoxyethyl group, a 2-n-propoxyethyl group, a 2-n-butoxyethyl group, a 4-i-propoxybutyl group, and a 3-i-butoxypropyl group; a halogen atom-substituted alkyl group such as a 2-chloroethyl group, a 4-chlorobutyl group, and a trifluoromethyl group; a cyano group-substituted alkyl group such as a cyanoethyl group; an aryl group-substituted alkyl group such as a benzyl group, a 2-phenylethyl group and a p-chlorobenzyl group; an aryloxy group-substituted alkyl group such as a phenoxymethyl group, a 2-phenoxyethyl group, and a 4-phenoxybutyl group; an alkoxycarbonyl group-substituted or an allyloxycarbonyl group-substituted alkyl group such as a 2-methoxycarbonylethyl group, a 3-n-butoxycarbonylpropyl group and a 2-allyloxycarbonylethyl group; an aryloxycarbonyl group-substituted alkyl group such as a 2-phenoxycarbonylethyl group and a 4-p-chlorophenoxycarbonylbutyl group; an aralkyloxy group-substituted alkyl group such as a 2-benzyloxyethyl group and a 4-benzyloxybutyl group; and an acyloxy group-substituted alkyl group such as a 2-acetoxyethyl group, a 2-benzoyloxyethyl group and a 4-acetoxybutyl group.

The carbon number of the alkyl group having the substituent is particularly preferably from 1 to 8 among them.

Each of the aryl groups as $R^1$ to $R^{10}$, $R^{9A}$, $R^{10A}$, $R^{9B}$, $R^{10B}$, $R^{9C}$ and $R^{10C}$ may be a phenyl group which may be substituted by a substituent selected from the group consisting of a $C_{1-8}$ linear or branched alkyl group; a halogen atom such as a fluorine atom, a chlorine atom or a bromine atom; a $C_{1-4}$ fluoroalkyl group; and a $C_{1-8}$ linear or branched alkoxy group.

Each of the cycloalkyl groups as $R^1$ and $R^2$ may be a $C_{5-7}$ cycloalkyl group such as a cyclopentyl group or a cyclohexyl group.

Each of the alkoxy groups as $R^3$, $R^7$, $R^8$ and the substituent of the ring A may be a $C_{1-12}$, preferably $C_{1-8}$ alkoxy group such as a methoxy group, an ethoxy group, an n-propoxy group, an i-propyloxy group, an n-butyloxy group, an i-butyloxy group, a t-butyloxy group, an n-hexyloxy group, an n-octyloxy group, or a 2-ethylhexyloxy group.

In a case where the alkoxy group is substituted, the substituent may be a halogen atom, an alkoxy group, an aryl group, a cyano group, an aryloxy group, an alkoxycarbonyl group, an aryloxycarbonyl group, an acyloxy group, or the like.

Each of the alkoxycarbonyl groups as $R^3$, $R^7$ and $R^8$ may be a $C_{2-12}$, preferably $C_{2-8}$ alkoxycarbonyl group such as a methoxycarbonyl group, an ethoxycarbonyl group, an n-propoxycarbonyl group, an i-propyloxycarbonyl group, an n-butyloxycarbonyl group, an i-butyloxycarbonyl group, a t-butyloxycarbonyl group, an n-hexyloxycarbonyl group, an n-octyloxycarbonyl group, a 2-ethylhexyloxycarbonyl group, or the like.

In a case where the alkoxycarbonyl group is substituted, the substituent may be a halogen atom, an alkoxy group, an aryl group, a cyano group, an aryloxy group, an alkoxycarbonyl group, an aryloxycarbonyl group, an acyloxy group, or the like.

The halogen atom as the substituent of the ring A may be a fluorine atom, a chlorine atom, a bromine atom, or the like. Furthermore, if the molecular weight is too large, solubility in a medium will become lower and reproducibility of a deep color will degrade. On the other hand, if the molecular weight is too small, reproducibility of a light color will degrade. Therefore, a total of the formula weights of the substituents $R^5$, $R^6$, $R^7$ and $R^8$ in the above general formula (II) is preferably at least 90, and more preferably at least 130. On the other hand, it is preferably at most 400, more preferably at most 300.

According to the present invention, the effects of the present invention can be obtained as long as the dyes having the above-mentioned skeletal structures are used in combination. In order to sufficiently achieve the effects of the present invention by virtue of the combination, however, it is preferred to use the dye having the arylidene pyrazolone skeleton with a molecular weight being usually at most 600, particularly at most 500, and more particularly in a range of from 240 to 500 and the molecular weight of the dye having the bispyrazolone methine skeleton is usually at most 600, particularly at most 500, and more particularly in a range of from 200 to 500, including the skeletal part and other partial structures.

Specific examples of the dyes represented by the above general formulae (I) and (II) are exemplified in the following Tables 1 and 2, respectively, but they are not limited to these examples. These dyes can be produced in accordance with the methods described, for example, in JP-A-2-3450 and JP-A-49-114420, respectively.

TABLE 1

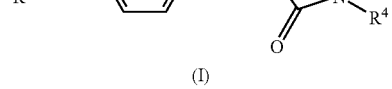

(I)

| Dye No. | Ring A | $R^1$ | $R^2$ | $R^3$ | $R^4$ |
|---|---|---|---|---|---|
| 1-1 | ⟨phenyl-1,4⟩ | $C_2H_5$ | $C_2H_5$ | $OC_2H_5$ | ⟨phenyl⟩ |
| 1-2 | ⟨phenyl-1,4⟩ | $C_2H_5$ | $C_2H_5$ | $N(CH_3)_2$ | ⟨phenyl⟩ |
| 1-3 | ⟨phenyl-1,4⟩ | $C_2H_5$ | $C_2H_5$ | $CH_3$ | ⟨phenyl⟩ |
| 1-4 | ⟨phenyl-1,4⟩ | $i\text{-}C_4H_9$ | $i\text{-}C_4H_9$ | $-COOC_2H_5$ | ⟨2,4,6-trichlorophenyl⟩ |
| 1-5 | ⟨phenyl-1,4⟩ | $i\text{-}C_4H_9$ | $i\text{-}C_4H_9$ | $OC_2H_5$ | ⟨phenyl⟩ |
| 1-6 | ⟨phenyl-1,4⟩ | $i\text{-}C_4H_9$ | $i\text{-}C_4H_9$ | $N(CH_3)_2$ | ⟨phenyl⟩ |
| 1-7 | ⟨phenyl-1,4⟩ | $C_2H_5$ | $C_2H_4OC_2H_5$ | $-CH_3$ | $-CH_3$ |
| 1-8 | ⟨phenyl-1,4⟩ | $n\text{-}C_3H_7$ | $n\text{-}C_3H_7$ | $-CH_3$ | $t\text{-}C_4H_9$ |
| 1-9 | ⟨phenyl-1,4⟩ | $CH_2CH=CH_2$ | $n\text{-}C_4H_9$ | $-CH_3$ | ⟨phenyl⟩ |

TABLE 1-continued
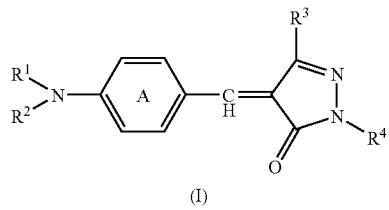
(I)
| Dye No. | Ring A | R¹ | R² | R³ | R⁴ |
|---|---|---|---|---|---|
| 1-10 | 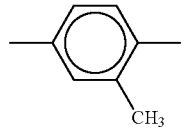 | C₂H₅ | i-C₄H₉ | —C₂H₅ |  |
| 1-11 |  | i-C₃H₇ | 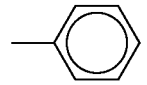 | —CH₃ |  |
| 1-12 | 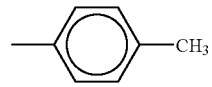 | n-C₈H₁₇ | C₂H₅ | H | 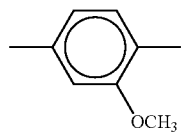 |
| 1-13 | 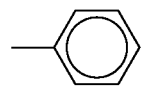 | —C₂H₄Cl | —C₂H₅ | —O-n-C₃H₇ |  |
| 1-14 |  | —C₂H₅ | —C₂H₄—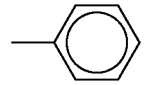 | CF₃ |  |
| 1-15 | 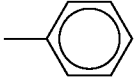 | —C₂H₅ | —C₃H₆OCH₃ | 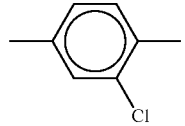 | —CH₃ |
| 1-16 | 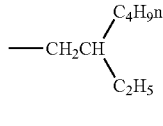 | —C₂H₅ | —CH₂CH(C₄H₉n)(C₂H₅) | —OCH₃ | 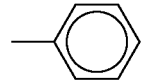 |
| 1-17 |  | —C₂H₅ | —C₂H₄OC₂H₄OC₂H₅ | -t-C₄H₉ | 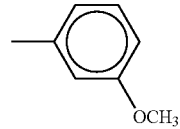 |
| 1-18 |  | —C₂H₅ | —C₂H₄C(O)OC₂H₅ | n-C₃H₇ | i-C₃H₇ |
| 1-19 | 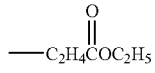 | —C₂H₅ | C₂H₄CN | —COO-1-C₃H₇ |  |
| 1-20 | 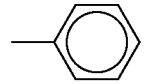 | —C₂H₅ | —C₂H₄OC(O)CH₃ | —CH₃ |  |

TABLE 1-continued
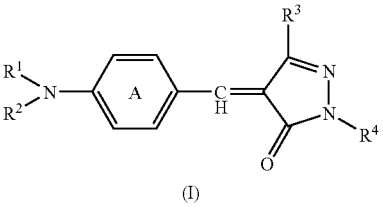
(I)
| Dye No. | Ring A | R¹ | R² | R³ | R⁴ |
|---|---|---|---|---|---|
| 1-21 |  | n-C$_6$H$_{13}$ | n-C$_6$H$_{13}$ | —CON(CH$_3$)$_2$ | 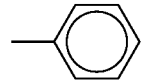 |
| 1-22 |  | n-C$_4$H$_9$ | n-C$_4$H$_9$ | —COO-n-C$_4$H$_9$ | 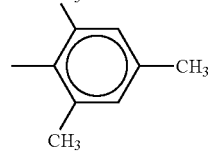 |
| 1-23 | 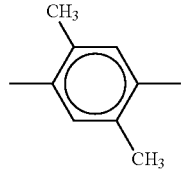 | —CH$_2$- | i-C$_4$H$_9$ | —O-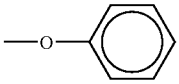 | 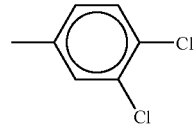 |
| 1-24 | 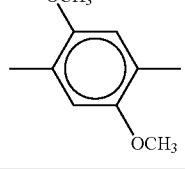 | C$_2$H$_4$OC(=O)-i-C$_3$H$_7$ | C$_2$H$_4$OC(=O)-i-C$_3$H$_7$ | —O-i-C$_4$H$_9$ | 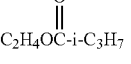 |
TABLE 2
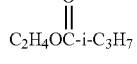
(II)
| Dye No. | R⁵ | R⁶ | R⁷ | R⁸ |
|---|---|---|---|---|
| 2-1 | 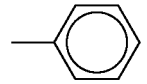 | 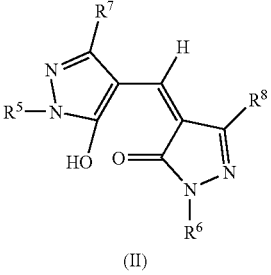 | —CH$_3$ | —CH$_3$ |
| 2-2 | 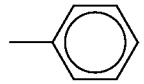 | 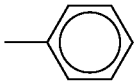 | —COOC$_2$H$_5$ | —COOC$_2$H$_5$ |

TABLE 2-continued
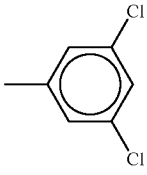
(II)
| Dye No. | R⁵ | R⁶ | R⁷ | R⁸ |
|---|---|---|---|---|
| 2-3 | 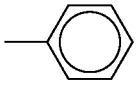 |  | —C₂H₅ | —C₂H₅ |
| 2-4 |  | 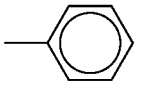 | —OC₂H₅ | —OC₂H₅ |
| 2-5 | 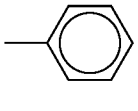 |  | —N(CH₃)₂ | —N(CH₃)₂ |
| 2-6 |  | 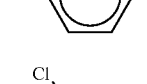 | —CON(CH₃)₂ | —CON(CH₃)₂ |
| 2-7 | 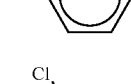 |  | -t-C₄H₉ | -t-C₄H₉ |
| 2-8 |  | 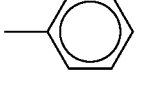 | —CH₃ | —CH₃ |
| 2-9 | —CH₃ | —CH₃ | 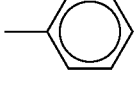 |  |
| 2-10 |  | 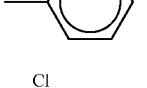 | —COOCH₃ | —COOCH₃ |
| 2-11 | 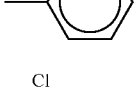 |  | -i-C₃H₇ | -i-C₃H₇ |
| 2-12 | t-C₄H₉ | t-C₄H₉ | —OCH₃ | —OCH₃ |
| 2-13 | i-C₃H₇ | i-C₃H₇ | n-C₄H₉ | n-C₄H₉ |
| 2-14 | —C₂H₅ | —C₂H₅ | —O-i-C₄H₉ | —O-i-C₄H₉ |

TABLE 2-continued

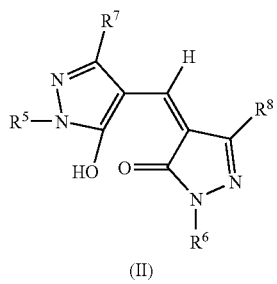

(II)

| Dye No. | $R^5$ | $R^6$ | $R^7$ | $R^8$ |
|---|---|---|---|---|
| 2-15 | 3,4-dimethylphenyl | phenyl | —CF$_3$ | —CF$_3$ |
| 2-16 | phenyl | phenyl | —COO-n-C$_4$H$_9$ | —COO-n-C$_4$H$_9$ |
| 2-17 | 3-methoxyphenyl | phenyl | —O-phenyl | —O-phenyl |
| 2-18 | 3,4-dichlorophenyl | 3,4-dichlorophenyl | -t-C$_4$H$_9$ | -t-C$_4$H$_9$ |
| 2-19 | phenyl | phenyl | —COO-phenyl-COO— | (continued) |
| 2-20 | —CH=CH$_2$ | phenyl | —CH$_3$ | —CH$_3$ |
| 2-21 | 2,4,5-trichlorophenyl | 2,4,5-trichlorophenyl | —COOC$_2$H$_5$ | —COOC$_2$H$_5$ |

In the thermal transfer recording ink and thermal transfer recording sheet of the present invention, a ratio of the dye having the arylidene pyrazolone skeleton to the dye having the bispyrazolone methine skeleton is preferably "the dye having the arylidene pyrazolone skeleton: the dye having the bispyrazolone methine skeleton"=1:9 to 9:1 (weight ratio), particularly preferably 2:8 to 8:2, and more particularly preferably 3:7 to 7:3. If an amount of the dye having the arylidene pyrazolone skeleton is off the above range, the effects of the present invention by virtue of the combined use with the dye having the bispyrazolone methine skeleton cannot be sufficiently obtained.

In order to meet the required standards of SWOP (Specifications Web Offset publications) color, the ratio can be appropriately selected within the above range, and, for example, it is preferable to set the ratio to "the dye having the arylidene pyrazolone skeleton: the dye having the bispyrazolone methine skeleton"=3:7 to 5:5 (weight ratio).

The thermal transfer ink of the present invention is one in which the dye having the arylidene pyrazolone skeleton and the dye having the bispyrazolone methine skeleton of the present invention are dissolved or dispersed in a medium.

Examples of the medium include water, alcohols such as methyl alcohol, ethyl alcohol, isopropyl alcohol and isobutyl alcohol, cellosolves such as methyl cellosolve and ethyl cellosolve, aromatics such as toluene, xylene, chlorobenzene, esters such as ethyl acetate and butyl acetate, ketones such as acetone, methyl ethyl ketone, methyl isobutyl ketone and cyclohexanone, chlorinated solvents such as methylene chloride, chloroform and trichloroethylene, ethers such as tetrahydrofuran and dioxane and organic solvents such as N,N-dimethylformamide and N-methylpyrrolidone. These solvents may be used singly or as a mixture of two or more kinds.

The ink of the present invention may further contain, in addition to the above dyes and medium, an additive such as organic or inorganic non-sublimating fine particles, a dispersant, an antistatic agent, an antifoaming agent, an antioxidant or a viscosity modifier, if necessary.

In the thermal transfer ink of the present invention, the total concentration of the dyes is preferably in a range of from 0.5 to 20 parts by weight, particularly preferably from 1 to 15 parts by weight, and more particularly preferably from 2 to 15 parts by weight, relative to 100 parts by weight of the ink. Furthermore, the ratio of the foregoing additive other than the dyes is preferably at most 5 parts by weight, particularly preferably at most 3 parts by weight relative to 100 parts by weight of the ink, and the lower limit of the additive, if added, is preferably at least 0.01 part by weight, particularly preferably at least 0.5 part by weight.

The thermal transfer sheet of the present invention comprises a substrate and a colorant layer formed thereon, wherein the colorant layer comprises the dye having the arylidene pyrazolone skeleton and the dye having the bispyrazolone methine skeleton. Furthermore, this cololant layer may contain a yellow dye of another structure except for the dye having the arylidene pyrazolone skeleton and the dye having the bispyrazolone methine skeleton as long as the effects of the present invention are not impaired.

There are no particular restrictions on a method for forming the colorant layer on the substrate, and the method adopted usually is a method of dissolving the dyes or dispersing them in a fine particle state, together with a binder, in the aforementioned medium to prepare an ink, applying the ink onto the substrate, and drying it.

Examples of the binder to be used here include watersoluble resins such as cellulose type, acrylic acid type, starch type and epoxy type resins, and resins soluble in an organic solvent, such as acrylic resin, methacrylic resin, polystyrene, polycarbonate, polyether sulfone, polyvinyl butyral, ethyl cellulose, acetyl cellulose, polyester, AS resin and phenoxy resin. An appropriate ratio of the binder to the dyes in the thermal transfer ink for forming the colorant layer is usually in a range of "binder:dye"=1:2 to 2:1 (weight ratio). The binder may also be one used singly or a mixture of two or more kinds.

A base film suitable for the substrate onto which the ink for forming a transfer sheet is applied is a thin paper such as a condenser paper or glassine paper, or a plastic film with good heat resistance such as polyester, polycarbonate, polyamide, polyimide or polyaramide, and an appropriate thickness thereof is usually in a range of from 3 to 50 μm.

Among the above-mentioned base films, a polyethylene terephthalate film is particularly advantageous in view of mechanical strength, solvent resistance, economical efficiency, and so on. However, the polyethylene terephthalate film does not necessarily exhibit sufficient heat resistance depending on circumstances, and does not permit adequate run of a thermal head. Thus, it may be provided with a heat-resistant resin layer containing e.g. a lubricant, highly lubricant heat-resistant fine particles, a surfactant and a binder on a surface opposite to a surface on which the colorant layer is formed, in order to improve the running of the thermal head. In this case, the lubricant may be, for example, a modified silicone compound such as an aminomodified silicone compound or a carboxy-modified silicone compound, the heat resistant fine particles may be fine particles of silica or the like, and the binder may be an acrylic resin or the like. The thickness of the heat-resistant resin layer is usually preferably in a range of from 0.1 to 50 μm.

The ink is applied onto the base film by means of a gravure coater, a reverse roll coater, a rod coater, an air doctor coater, or the like, and the ink is preferably applied so that the thickness of the colorant layer after dried is in a range of from 0.1 to 5 μm.

A heating means for the thermal transfer sheet of the present invention is not only the thermal head but also an infrared ray, a laser beam, or the like. Furthermore, the base film itself can be an electrically heating film which generates heat with supply of an electric current, whereby the sheet can be used as an electric dye transfer sheet.

In the thermal transfer recording, color printing is normally carried out by repeating thermal recording operations with transfer sheets of three colors of yellow, magenta and cyan or of four colors of the foregoing three colors and black. A hue of an image obtained is represented by value $L^*$, value $a^*$ and value $b^*$ in a CIELAB space, and hues of images having similar color densities and values $L^*$ can be compared by their values $a^*$ and values $b^*$.

The present invention can achieve hues preferable as hues for yellow in color reproduction of color images, i.e. those with the value $a^*$ of at least −13 and at most 10, particularly preferably at least −13 and at most 5 and the value $b^*$ of at least 60, preferably at least 65, particularly preferably at least 70 in a CIELAB space at a color density of 1.0, in setting at a view angle of 2° and with a D50 light source. It is noted that this range also includes the color standard SWOP (Specifications Web Offset Publications) of color proof ink for use in the printing industry.

Furthermore, the transfer density is also excellent and, for example, when recorded by the method in examples of the present invention, the color density is usually at least 1.8, preferably at least 2.0.

Moreover, a yellow recorded image (color density of about 1.0) using the ink of the present invention is so excellent in light resistance that the degree of discoloring and fading $\{\Delta E(L^*, a^*, b^*)\}$ of the recorded product after a light resistance test of exposure at a black panel temperature: 58±3° C. and for 40 hours in a xenon weatherometer Ci4000 (manufactured by Atlas) is at most 10, preferably at most 5. In the case of a green recorded image (color density of about 1.0) using an indoaniline type cyan dye, specifically, an indoaniline type dye as represented by the general formula (III), used in the example below, the results of the light resistance test of $\{\Delta E(L^*, a^*, b^*)\}$ were at most 20, preferably at most 15, thus demonstrating excellent light resistance even when mixed with the cyan dye.

The thermal transfer ink and thermal transfer sheet of the present invention are so comprehensively excellent that the recording density of the thermal transfer recording is high, that the color tone of the recorded product is clear, and that the stability of the recorded product is high, and they are also excellent, particularly, in the light resistance of the recorded product. In addition, they are also advantageously industrially produced because the dyes can be easily produced.

EXAMPLES

The present invention will be described in further detail with reference to Examples and Comparative Examples, but it should be understood that the present invention is by no means restricted thereto, without departing from the scope of the invention.

Example 1

Mixtures of compositions below were treated with an ultrasonic cleaning machine for 30 minutes to prepare ink (Y) and ink (C).

[Composition of Ink (Y) (Parts by Weight)]
Dye No. 1-1: 3.0
Dye No. 2-1: 3.0
Phenoxy resin ("PKHJ" manufactured by Union Carbide Corporation): 10
Tetrahydrofuran: 90

[Composition of Ink (C) (Parts by Weight)]
Cyan dye (constitutional formula (III)): 8.0
Phenoxy resin ("PKHJ" manufactured by Union Carbide Corporation): 10
Tetrahydrofuran: 90

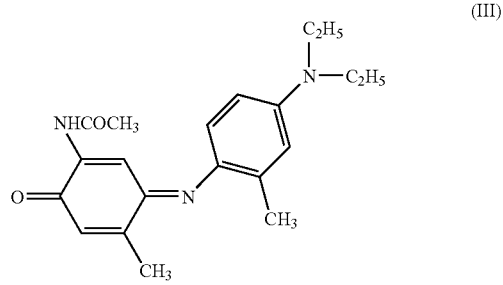

(III)

Each of the inks (Y) and (C) obtained was applied onto a polyethylene terephthalate film (6 μm thick) by means of a wire bar and dried (dry film thickness of about 1 μm) to form a colorant layer. Then a liquid containing 10 parts by weight of an acrylic resin (Trade name: BR-80 manufactured by Mitsubishi Rayon Co., Ltd.), 1 part by weight of an amino-modified silicone oil (Trade name: KF393 manufactured by Shin-Etsu Chemical Co., Ltd.) and 89 parts by weight of toluene was applied onto the back surface of each of the polyethylene terephthalate films and dried (to dried film thickness of about 1 μm) to form a heat resistant resin layer, thereby obtaining thermal transfer sheet (Y) and thermal transfer sheet (C).

The thermal transfer sheet (Y) obtained was connected to an ink ribbon of VM-MPA50 for a printer "NV-MPX5" manufactured by Matsushita Electric Industries Co., Ltd., and a gradation image was recorded on the recording sheet of VM-MPA50 by means of the printer "NV-MPX5" manufactured by Matsushita Electric Industries Co., Ltd., thereby obtaining a recorded product of a yellow color tone in a color density with the maximum print density shown in Table 4.

Furthermore, the value a* and value b* were measured in the CIELAB space at a color density of 1.0, in setting at a view angle of 2° and with a D50 light source. Table 4 shows the results.

Here the color density, and the CIELAB value a* and value b* were measured by means of a spectrophotometer (Trade name: SPM-50 manufactured by Gretag).

The aforementioned transfer sheets (Y) and (C) were subjected to transfer recording in a stacked state in this order on an identical image receiver under the same recording condition as above, thereby obtaining a recorded product of a green color tone.

Furthermore, light resistance tests of the yellow recorded product and the green recorded product thus obtained (in the color density of about 1.0) were carried out by means of the xenon weatherometer Ci4000 (manufactured by Atlas)(at the black panel temperature: 58±3° C). Table 4 shows degrees of discoloring and fading {ΔE(L*, a*, b*)} of the recorded products after exposed to light for 40 hours.

Examples 2 to 3

The preparation of inks, preparation of thermal transfer sheets, transfer recording and light resistance tests were carried out in the same manner as in Example 1 except that the dyes shown in Table 3 were used as yellow dyes. Table 4 shows the results.

Comparative Examples 1 to 9

The preparation of inks, preparation of thermal transfer sheets, transfer recording and light resistance tests were carried out in the same manner as in Example 1 except that the dyes shown in Table 3 were used as yellow dyes. Table 4 shows the results. Structures of Dye A to Dye G are as follows:

Dye A (Dye W described in JP-A-4-265792)

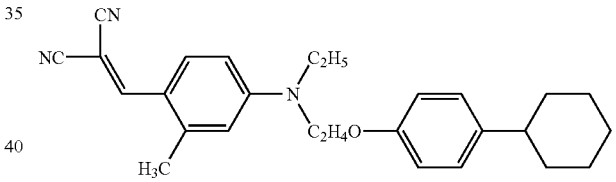

Dye B (Dye A described in JP-A-4-275184)

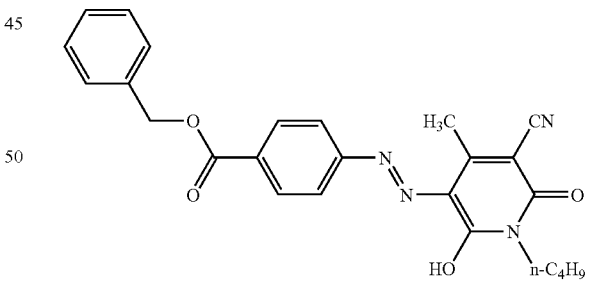

Dye C (C. I. Solvent Yellow 16 described in JP-A-10-864)

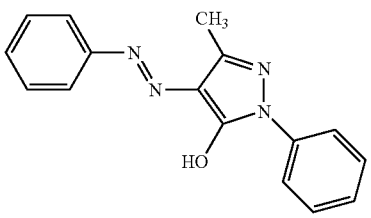

Dye D (Dye 1-1 described in JP-A-10-181224)

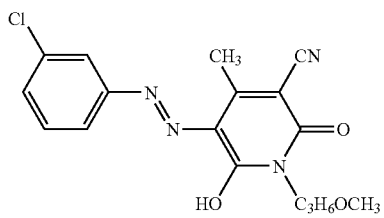

Dye E (a dye represented by the constitutional formula (II) described in JP-A-10-203029)

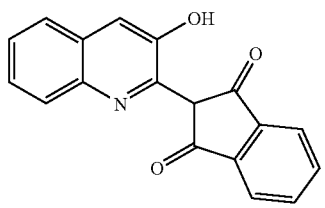

Dye F (Dye 2-1 described in JP-A-2000-103174)

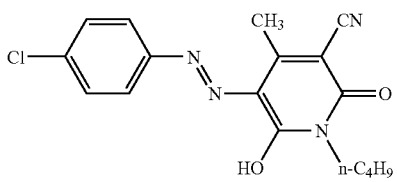

Dye G (Dye 3-1 described in JP-A-2000-103174)

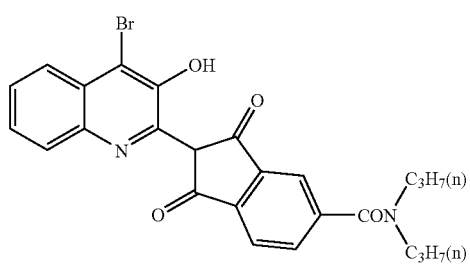

In addition, Dye No. 1-2 in Comparative Example 2 corresponds to Dye No. 1 described in JP-A-2-3450, and Dye No. 2-1 in Comparative Example 3 corresponds to the dye used in Example 1 described in JP-A-10-864 (C. I. Solvent Yellow 93).

Comparative Example 4 corresponds to the combination of dyes used in Examples of JP-A-4-265792, Comparative Example 5 corresponds to the combination of the dyes used in Examples described in JP-A-4-275184, Comparative Example 6 corresponds to the combination of the dyes used in Example 3 described in JP-A-10-864, Comparative Example 7 corresponds to the combination of the dyes used in Example 1 described in JP-A-10-181224, Comparative Example 8 corresponds to the combination of the dyes used in Example 1 in JP-A-10-203029, and Comparative Example 9 corresponds to the combination of the dyes used in Example 1 in JP-A-2000-103174.

TABLE 3

| Example | Arylidene pyrazolone type dye | | Bispyrazolone methine type dye | | Other dye | |
|---|---|---|---|---|---|---|
| | No. | Content (Parts by weight) | No. | Content (Parts by weight) | No. | Content (Parts by weight) |
| Ex. 1 | 1-1 | 3.0 | 2-1 | 3.0 | | |
| Ex. 2 | 1-1 | 2.0 | 2-1 | 4.0 | | |
| Ex. 3 | 1-2 | 2.4 | 2-1 | 3.6 | | |
| Comp. Ex. 1 | 1-1 | 6.0 | | | | |
| Comp. Ex. 2 | 1-2 | 6.0 | | | | |
| Comp. Ex. 3 | | | 2-1 | 6.0 | | |
| Comp. Ex. 4 | 1-2 | 2.4 | | | Dye A | 3.6 |
| Comp. Ex. 5 | 1-2 | 2.4 | | | Dye B | 3.6 |
| Comp. Ex. 6 | | | 2-1 | 4.5 | Dye C | 1.5 |
| Comp. Ex. 7 | | | 2-1 | 3.0 | Dye D | 3.0 |
| Comp. Ex. 8 | | | 2-1 | 3.0 | Dye E | 3.0 |
| Comp. Ex. 9 | | | 2-1 | 2.0 | Dye F | 2.0 |
| | | | | | Dye G | 2.0 |

TABLE 4

| | Test results | | | | |
|---|---|---|---|---|---|
| Example | Color density | value a* | value b* | Light resistance (yellow) ΔE | Light resistance (green) ΔE |
| Ex. 1 | 2.4 | 3.4 | 72.2 | 4 | 13 |
| Ex. 2 | 2.4 | 1.4 | 68.7 | 4 | 13 |
| Ex. 3 | 2.4 | ±0 | 71.0 | 6 | 13 |
| Comp. Ex. 1 | 2.2 | 13.0 | 85.9 | 2 | 12 |
| Comp. Ex. 2 | 2.2 | 10.9 | 87.9 | 3 | 11 |
| Comp. Ex. 3 | 1.6 | −11.9 | 54.6 | 2 | 14 |
| Comp. Ex. 4 | 2.0 | ±0 | 74.3 | 20 | 38 |
| Comp. Ex. 5 | 2.2 | 1.3 | 71.6 | 14 | 40 |
| Comp. Ex. 6 | 1.6 | −10.5 | 54.7 | 4 | 14 |
| Comp. Ex. 7 | 2.2 | −12.6 | 60.3 | 7 | 23 |
| Comp. Ex. 8 | 1.5 | −11.4 | 56.1 | 3 | 13 |
| Comp. Ex. 9 | 2.2 | −10.6 | 65.9 | 6 | 37 |

It is clear from the comparison between Examples and Comparative Examples as described above that the present invention can provide the recorded products with the excellent transfer density in a good balance of the a* value and b* value.

Example 4

The preparation of a transfer sheet, transfer recording and evaluation were carried out in the same manner as in Example 1 using an ink prepared by the method below instead of the ink used in Example 1, thereby achieving recoding in uniform color density. Furthermore, it was confirmed that the recorded product thus obtained had good light resistance.

[Composition of Ink (Parts by Weight)]

Dye No. 1-1: 3.0

Dye No. 2-1: 3.0

AS resin (product name: Denka AS-S manufactured by Denki Kagaku Kogyo K.K.): 10

Toluene: 70

Cyclohexanone: 10

What is claimed is:

1. A thermal transfer ink, comprising:
   (1) an arylidene pyrazolone dye represented by the following formula (I):

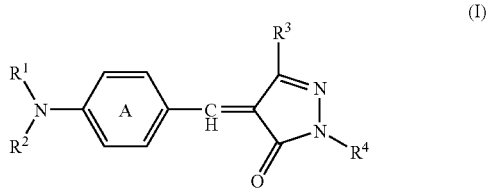

wherein ring A is a benzene ring which optionally has an substituent,
   each of $R^1$ and $R^2$ which are independent of each other, is a hydrogen atom, an alkyl group which optionally is substituted, an allyl group, an aryl group which optionally is substituted, or a cycloalkyl group which optionally is substituted,
   $R^3$ is a hydrogen atom, an alkyl group which optionally is substituted, an $NR^9R^{10}$ group, an alkoxy group which optionally is substituted, an alkoxycarbonyl group which optionally is substituted, an aryl group which optionally is substituted, or a $C(O)NR^{9A}R^{10A}$ group,
   $R^4$ is an alkyl group which optionally is substituted, or an aryl group which optionally is substituted, and
   each of $R^9$, $R^{10}$, $R^{9A}$ and $R^{10A}$ which are independent of one another, is a hydrogen atom, an alkyl group which optionally is substituted, or an aryl group which optionally is substituted;
   (2) a bispyrazolone methine dye represented by the following formula (II):

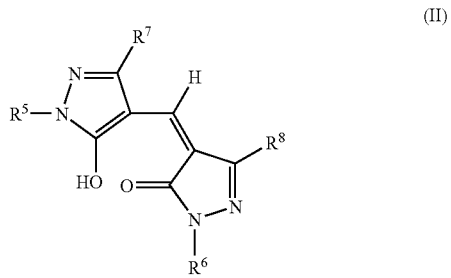

wherein each of $R^5$ and $R^6$ which are independent of each other, is an alkyl group which optionally is substituted, an alkenyl group which optionally is substituted, or an aryl group which optionally is substituted,
   each of $R^7$ and $R^8$ which are independent of each other, is an alkyl group which optionally is substituted, an $NR^{9B}R^{10B}$ group, an alkoxy group which optionally is substituted, an alkoxycarbonyl group which may be substituted, an aryl group which optionally is substituted, or a $C(O)NR^{9C}R^{10C}$ group, and
   each of $R^{9B}$, $R^{10B}$, $R^{9C}$ and $R^{10C}$ which are independent of one another, is a hydrogen atom, an alkyl group which optionally is substituted, or an aryl group which optionally is substituted; and
   (3) a medium.

2. The thermal transfer ink according to claim 1, wherein in the arylidene pyrazolone dye represented by the formula (I), ring A is a benzene ring which optionally is substituted by a substituent selected from the group consisting of a $C_{1-10}$ alkyl group which optionally is substituted, a $C_{1-10}$ alkoxy group which optionally is substituted, and a halogen atom,
   each of $R^1$ and $R^2$ which are independent of each other, is a $C_{1-12}$ alkyl group which optionally is substituted, an allyl group, a $C_{6-10}$ aryl group which optionally is substituted, or a $C_{5-7}$ cycloalkyl group which optionally is substituted,
   $R^3$ is a hydrogen atom, a $C_{1-10}$ alkyl group which optionally is substituted, a $C_{1-8}$ $NR^9R^{10}$ group, a $C_{1-8}$ alkoxy group which optionally is substituted, a $C_{2-9}$ alkoxycarbonyl group which optionally is substituted, a $C_{6-10}$ aryl group which optionally is substituted, or a $C_{3-9}$ $C(O)NR^{9A}R^{10A}$ group, and
   $R^4$ is a $C_{1-12}$ alkyl group which optionally is substituted, or a $C_{6-10}$ aryl group which optionally is substituted.

3. The thermal transfer ink according to claim 1, wherein in the bispyrazolone methine dye represented by the formula (II), each of $R^5$ and $R^6$ which are independent of each other, is a $C_{1-10}$ alkyl group which optionally is substituted, a $C_{1-10}$ alkenyl group which optionally is substituted, or a $C_{6-10}$ aryl group which optionally is substituted, and
   each of $R^7$ and $R^8$ which are independent of each other, is a $C_{1-10}$ alkyl group which optionally is substituted, a $C_{1-8}$ $NR^{9B}R^{10B}$ group, a $C_{1-8}$ alkoxy group which optionally is substituted, a $C_{2-9}$ alkoxycarbonyl group which optionally is substituted, a $C_{6-10}$ aryl group which optionally is substituted, or a $C_{3-9}$ $C(O)NR^{9C}R^{10C}$ group.

4. A thermal transfer recording sheet, comprising:
   a substrate and a colorant layer formed thereon, wherein the colorant layer comprises an arylidene pyrazolone dye represented by the following formula (I):

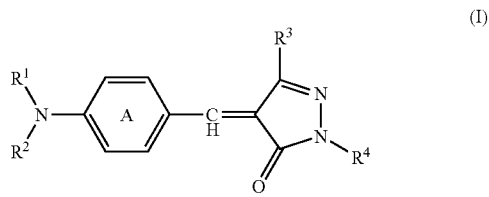

wherein ring A is a benzene ring which optionally has a substituent,
   each of $R^1$ and $R^2$ which are independent of each other, is a hydrogen atom, an alkyl group which optionally is substituted, an allyl group, an aryl group which optionally is substituted, or a cycloalkyl group which optionally is substituted,
   $R^3$ is a hydrogen atom, an alkyl group which optionally is substituted, an $NR^9R^{10}$ group, an alkoxy group which optionally is substituted, an alkoxycarbonyl group which optionally is substituted, an aryl group which optionally is substituted, or a $C(O)NR^{9A}R^{10A}$ group,
   $R^4$ is an alkyl group which optionally is substituted, or an aryl group which optionally is substituted, and
   each of $R^9$, $R^{10}$, $R^{9A}$ and $R^{10A}$ which are independent of one another, is a hydrogen atom, an alkyl group which optionally is substituted, or an aryl group which optionally is substituted; and
   (2) a bispyrazolone methine dye represented by the following formula (II):

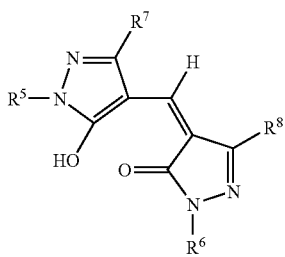

(II)

wherein each of $R^5$ and $R^6$ which are independent of each other, is an alkyl group which optionally is substituted, an alkenyl group which optionally is substituted, or an aryl group which optionally is substituted, each of $R^7$ and $R^8$ which are independent of each other, is an alkyl group which optionally is substituted, an $NR^{9B}R^{10B}$ group, an alkoxy group which optionally is substituted, an alkoxycarbonyl group which optionally is substituted, an aryl group which optionally is substituted, or a $C(O)NR^{9C}R^{10C}$ group, and each of $R^{9B}$, $R^{10B}$, $R^{9C}$ and $R^{10C}$ which are independent of one another, is a hydrogen atom, an alkyl group which optionally is substituted, or an aryl group which optionally is substituted.

5. The thermal transfer recording sheet according to claim 4, wherein in the arylidene pyrazolone dye represented by the formula (I), the ring A is a benzene ring which optionally is substituted by a substituent selected from the group consisting of a $C_{1-10}$ alkyl group which optionally is substituted, a $C_{1-10}$ alkoxy group which optionally is substituted, and a halogen atom, each of $R^1$ and $R^2$ which are independent of each other, is a $C_{1-12}$ alkyl group which optionally is substituted, an allyl group, a $C_{6-10}$ aryl group which optionally is substituted, or a $C_{5-7}$ cycloalkyl group which optionally is substituted, $R^3$ is a hydrogen atom, a $C_{1-10}$ alkyl group which optionally is substituted, a $C_{1-8}$ $NR^9R^{10}$ group, a $C_{1-8}$ alkoxy group which optionally is substituted, a $C_{2-9}$ alkoxycarbonyl group which optionally is substituted, a $C_{6-10}$ aryl group which optionally is substituted, or a $C_{3-9}$ $C(O)NR^{9A}R^{10A}$ group, and $R^4$ is a $C_{1-12}$ alkyl group which optionally is substituted, or a $C_{6-10}$ aryl group which optionally is substituted.

6. The thermal transfer recording sheet according claim 4, wherein in the bispyrazolone methine dye represented by the formula (II), each of $R^5$ and $R^6$ which are independent of each other, is a $C_{1-10}$ alkyl group which optionally is substituted, a $C_{1-10}$ alkenyl group which optionally is substituted, or a $C_{6-10}$ aryl group which optionally is substituted, and each of $R^7$ and $R^8$, which are independent of each other, is a $C_{1-10}$ alkyl group which optionally is substituted, a $C_{1-8}$ $NR^{9B}R^{10B}$ group, alkoxy group which optionally is substituted, a $C_{2-9}$ alkoxycarbonyl group which optionally is substituted, a $C_{6-10}$ aryl group which optionally is substituted, or a $C_{3-9}$ $C(O)NR^{9C}R^{10C}$ group.

7. A thermal transfer recording method, which comprises:
conducting thermal transfer recording with the thermal transfer recording sheet as defined in claim 4, wherein a recorded image has a value a* of at least −13 and at most 10 and a value b* of at least 60 in a CIELAB space at a color density of 1.0, in setting at a view angle of 2° and with a D50 light source.

* * * * *